(12) United States Patent
Lei et al.

(10) Patent No.: US 9,560,359 B2
(45) Date of Patent: Jan. 31, 2017

(54) METHOD AND APPARATUS OF LUMA-BASED CHROMA INTRA PREDICTION

(71) Applicant: MEDIATEK Singapore Pte. Ltd., Singapore (SG)

(72) Inventors: Shaw-Min Lei, Hsinchu County (TW); Xun Guo, Beijing (CN)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 270 days.

(21) Appl. No.: 14/368,283

(22) PCT Filed: Dec. 28, 2012

(86) PCT No.: PCT/CN2012/087755
§ 371 (c)(1),
(2) Date: Jun. 23, 2014

(87) PCT Pub. No.: WO2013/102418
PCT Pub. Date: Jul. 11, 2013

(65) Prior Publication Data
US 2014/0355667 A1    Dec. 4, 2014

(30) Foreign Application Priority Data

Jan. 4, 2012    (CN) .................. PCT/CN2012/070009

(51) Int. Cl.
*H04N 7/12*    (2006.01)
*H04N 19/105*    (2014.01)
(Continued)

(52) U.S. Cl.
CPC .......... *H04N 19/105* (2014.11); *H04N 19/136* (2014.11); *H04N 19/167* (2014.11);
(Continued)

(58) Field of Classification Search
IPC .................................................... H04N 19/102
See application file for complete search history.

(56) References Cited

U.S. PATENT DOCUMENTS 5,659,365 A    8/1997    Wilkinson
7,787,048 B1    8/2010    Vojkovich et al.
(Continued)

FOREIGN PATENT DOCUMENTS

CN    1784015 A    6/2006
CN    101820546    9/2010
(Continued)

OTHER PUBLICATIONS

Bross, B., et al.; "WD5 Working Draft 5 of High-Efficiency Video Coding;" Joint Collaborative Team on Video Coding (JCT-VC) of ITU-T SG16 WP3 and ISO/IEC JTC1/SC29/WG11; Nov. 2011; pp. 1-213.
(Continued)

*Primary Examiner* — Tracy Y Li
(74) *Attorney, Agent, or Firm* — McClure, Qualey & Rodack, LLP

(57) ABSTRACT

A method and apparatus for luma-based chroma intra prediction for a current chroma block are disclosed. The chroma intra predictor is derived from reconstructed luma pixels of a current luma block according to the chroma sampling format. Depending on the chroma sampling format, either sub-sampling, down-sampling or no processing is applied to the reconstructed luma pixels in horizontal or vertical direction. The information associated with the chroma sampling format can be incorporated in the sequence parameter set (SPS), the picture parameter set (PPS), the adaptation parameter set (APS) or the slice header of a video bitstream.

20 Claims, 5 Drawing Sheets

(51) Int. Cl.
*H04N 19/593* (2014.01)
*H04N 19/186* (2014.01)
*H04N 19/59* (2014.01)
*H04N 19/136* (2014.01)
*H04N 19/167* (2014.01)
*H04N 19/176* (2014.01)
*H04N 19/11* (2014.01)
*H04N 19/157* (2014.01)
*H04N 19/16* (2014.01)

(52) U.S. Cl.
CPC ........... *H04N 19/186* (2014.11); *H04N 19/59* (2014.11); *H04N 19/593* (2014.11); *H04N 19/11* (2014.11); *H04N 19/157* (2014.11); *H04N 19/16* (2014.11); *H04N 19/176* (2014.11)

(56) References Cited

U.S. PATENT DOCUMENTS

| | | | |
|---|---|---|---|
| 2003/0108099 A1 | 6/2003 | Nagumo et al. | |
| 2010/0157073 A1 | 6/2010 | Kondo et al. | |
| 2013/0142260 A1* | 6/2013 | Wahadaniah | H04N 19/50 375/240.12 |
| 2013/0259120 A1* | 10/2013 | Van der Auwera | H04N 19/00096 375/240.03 |
| 2014/0092998 A1* | 4/2014 | Zhu | H04N 19/70 375/240.29 |
| 2014/0098868 A1* | 4/2014 | Wang | H04N 19/70 375/240.13 |
| 2014/0112394 A1* | 4/2014 | Sullivan | H04N 19/46 375/240.26 |
| 2014/0233650 A1* | 8/2014 | Zhang | H04N 19/00763 375/240.16 |
| 2015/0373332 A1* | 12/2015 | Kim | H04N 19/176 375/240.03 |

FOREIGN PATENT DOCUMENTS

| | | |
|---|---|---|
| CN | 101902653 A | 12/2010 |
| EP | 2 725 794 | 4/2014 |
| JP | 2010041191 | 2/2010 |

OTHER PUBLICATIONS

"ITU-T Recommendations H.264. Advanced video coding for generic audiovisual services;" ITU-T Telecommunication Standardization Sector of ITU; 2005; pp. 1-343.

Non-Final Office Action dated Mar. 26, 2015, issued in U.S. Appl. No. 14/123,094.

Chen, J., et al.; "Chroma Intra Prediction by Reconstructed Luma Samples;" Joint Collaborative Team on Video Coding (JCT-VC) if ITU-T SG16 WP3 and ISO/IEC JTC1/SC29/WG11; Oct. 2010; pp. 1-7.

Francois, E., et al.; "Non-CE6a: Use of Chroma Phase in LM Mode;" Joint Collaborative Team on Video Coding (JCT-VC) of ITU-T SG16 WP3 and ISO/IEC JTC1/SC29/WG11; Nov. 2011; pp. 1-14.

Kim, J., et al.; New Intra Chroma Prediction using Inter Channel Correlation; Joint Collaborative Team on Video Coding (JCT-VC) of ITU-T SG16 WP3 and ISO/IEC JTC1/SC29/WG11; Jul. 2010; pp. 1-9.

Minezawa, A., et al.; "An Improvement to Chroma Instar Prediction from Luma;" Joint Collaborative Team on Video Coding (JCT-VC) of ITU-T SG16 WP3 and ISO/IEC JTC1/SC29/WG11; Jul. 2011; pp. 1-10.

Chiu, Y.J., et al.; "Cross-Channel Techniques to Improve Intra Chroma Prediction;" Joint Collaborative Team on Video Coding (JCT-VC) of ITU-T SG16 WP3 and ISO/IEC JTC1/SC291WG11; Jul. 2011; pp. 1-6.

Bross, B., et al.; "WD4: Working Draft 4 of High-Efficiency Video Coding;" Joint Collaborative Team on Video Coding (JCT-VC) of ITU-T SG16 WP3 and ISO/IEC JTC1/SC29/WG11; Jul. 2011; pp. 1-215.

Lee, S.H., et al.; "Intra Prediction Method Based on the Linear Relationship Between the Channels for YUV 4:2:0 Intra Coding;" IEEE; Nov. 2009; pp. 1-4.

Lee, S.H., et al.; "A New Intra Prediction Method using Channel Correlations for the H.264/AVC Intra Coding;" May 2009; pp. 1-4.

Luis F. R. Lucas et al.: "Intra-Prediction For Color Image Coding Using YUV Correlation", Preceedings of 2010 IEEE 17th International Conference on Image Processing, Sep. 26-29, 2010, Hong Kong, pp. 1329-1332, the abstract, part 1 to part 3.1.

Chen Jianle et al.: "CE6.a: Chroma intra prediction by reconstructed luma samples", Joint Collaborative Team on Video Coding (JCT-VC) of ITU-T SG 16 WP3 and ISO/IEC JTC1/SC29/WG11 JCTVC-D350 4th Meeting :Daegu, KR, Jan. 20-28, 2011, the whole document.

* cited by examiner

METHOD AND APPARATUS OF LUMA-BASED CHROMA INTRA PREDICTION

CROSS REFERENCE TO RELATED APPLICATIONS

The present invention claims priority to PCT Patent Application, Serial No. PCT/CN2012/070009, filed Jan. 4, 2012, entitled "Improvements of Luma-based Chroma Intra Prediction". The PCT Patent Application is hereby incorporated by reference in its entirety.

TECHNICAL FIELD

The present invention relates to video coding. In particular, the present invention relates to coding techniques associated with chroma intra prediction based on reconstructed luma pixels.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra coding is required to compress the regions with high motion or scene changes. Besides, intra coding is also used to process an initial picture or to periodically insert I-pictures or I-blocks for random access or for alleviation of error propagation. Intra prediction exploits the spatial correlation within a picture or within a picture region. In practice, a picture or a picture region is divided into blocks and the intra prediction is performed on a block basis. Intra prediction for a current block can rely on pixels in neighboring blocks that have been processed. For example, if blocks in a picture or picture region are processed row by row first from left to right and then from top to bottom, neighboring blocks on the top and neighboring blocks on the left of the current block can be used to form intra prediction for pixels in the current block. While any pixels in the processed neighboring blocks can be used for intra predictor of pixels in the current block, very often only pixels of the neighboring blocks that are adjacent to the current block boundaries on the top and on the left are used.

The intra predictor is usually designed to exploit spatial features in the picture such as smooth area (DC mode), vertical line or edge, horizontal line or edge and diagonal line or edge. Furthermore, spatial correlation often exists between the luminance (luma) and chrominance (chroma) components. Therefore, reconstructed luma pixels can be used to derive the intra chroma prediction. In recent development of High Efficiency Video Coding (HEVC), a chroma intra prediction method based on co-located reconstructed luma blocks has been disclosed. The type of chroma intra prediction is termed as LM prediction. The main concept is to use the reconstructed luma pixels to generate the predictors of corresponding chroma pixels. FIG. 1 illustrates the prediction procedure. First, the neighboring reconstructed pixels of a co-located luma block in FIG. 1A and the neighboring reconstructed pixels of a chroma block in FIG. 1B are used to derive the correlation parameters between the blocks. Then, the predicted pixels of the chroma block are generated using the parameters and the reconstructed pixels of the luma block. In the parameters derivation, the first above reconstructed pixel row and the second left reconstructed pixel column of the current luma block are used. The specific row and column of the luma block are used in order to match the 4:2:0 sampling format of the chroma components.

According to the LM prediction mode, the chroma values are predicted from reconstructed luma values of a co-located block. The chroma components may have lower spatial resolution than the luma component. In order to use the luma signal for chroma intra prediction, the resolution of the luma signal may have to be reduced to match with that of the chroma components.

For example, for the 4:2:0 sampling format, the U and V components only have half of the number of samples in vertical and horizontal directions as the luma component. Therefore, 2:1 resolution reduction in vertical and horizontal directions has to be applied to the reconstructed luma samples. The resolution reduction can be achieved by down-sampling process or sub-sampling process.

The down-sampling process in this disclosure refers to signal decimation by applying proper low-pass filtering to reduce possible signal aliasing before reducing resolution (also called decimation in the art). On the other hand, sub-sampling process performs direct decimation without prior filtering. Both the down-sampling process and the sub-sampling process can reduce sampling resolution. While the sub-sampling processing may cause signal aliasing, the sub-sampling processing is used in some signal processing systems due to its simplicity. For chroma intra prediction according to the LM mode, the sub-sampling process is used in horizontal direction and the down-sampling process is used in vertical direction.

In the current HEVC system, the parameter derivation has always assumed the underlying chroma component uses the 4:2:0 sampling format. It is desirable to develop flexible LM-based chroma intra prediction that can adaptively accommodate other chroma sampling formats.

SUMMARY

A method and apparatus for luma-based chroma intra prediction for a current chroma block are disclosed. The chroma intra predictor is derived from reconstructed luma pixels of a current luma block according to the chroma sampling format. In one embodiment according to the present invention, the method for chroma intra prediction receives neighboring reconstructed luma pixels and current reconstructed luma pixels of the current luma block from storage or a processor. The neighboring reconstructed luma pixels comprise a first group of the reconstructed luma pixels above a top boundary of the current luma block and a second group of the reconstructed luma pixels to a left boundary of the current luma block. In an embodiment, the first group of the reconstructed luma pixels correspond to a first top pixel row from the top boundary of the current luma block and the second group of the reconstructed luma pixels correspond to a first left pixel column from the left boundary of the current luma block for any chroma sampling format. The chroma sampling format is then determined, the encoder is aware of the chroma sampling format and in a decoder, the chroma sampling format may be determined from the received video bitstream. The chroma intra prediction for a corresponding chroma block is then derived based on the neighboring reconstructed luma pixels and the current reconstructed luma pixels of the current luma block, wherein said deriving chroma intra prediction is according to the chroma sampling format. The chroma intra prediction is then provided for encoding or decoding of chroma pixels in the corresponding chroma.

Depending on the chroma sampling format, either subsampling, down-sampling or no processing is applied to the reconstructed luma pixels in horizontal or vertical direction. The information associated with the chroma sampling format can be incorporated in the sequence parameter set (SPS), the picture parameter set (PPS), the adaptation parameter set (APS) or the slice header of a video bitstream.

DETAILED DESCRIPTION

As mentioned before, the existing LM mode is not flexible and the method is not efficient when the chroma pixels do not correspond to the 4:2:0 sampling format. Accordingly, embodiments based on the present invention provide flexible LM-based chroma intra prediction that supports different chroma sampling formats adaptively.

Figure 2:
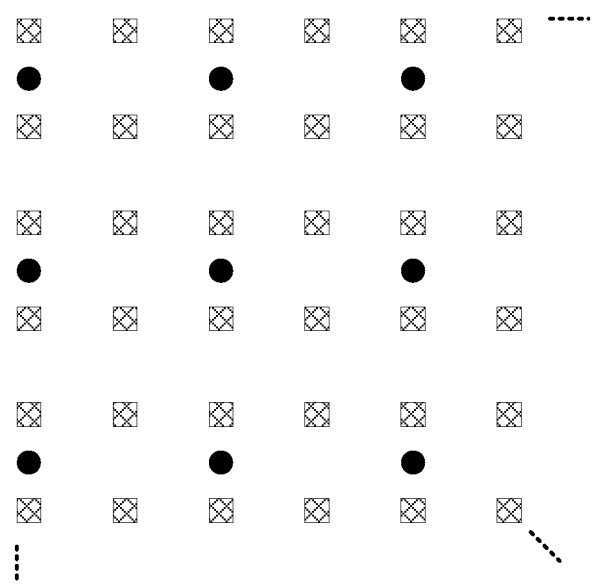
FIG. 2 illustrates an example of 4:2:0 sampling format, where a sampling pattern of the chroma samples with reference to the luma samples is shown.
Figure 3:
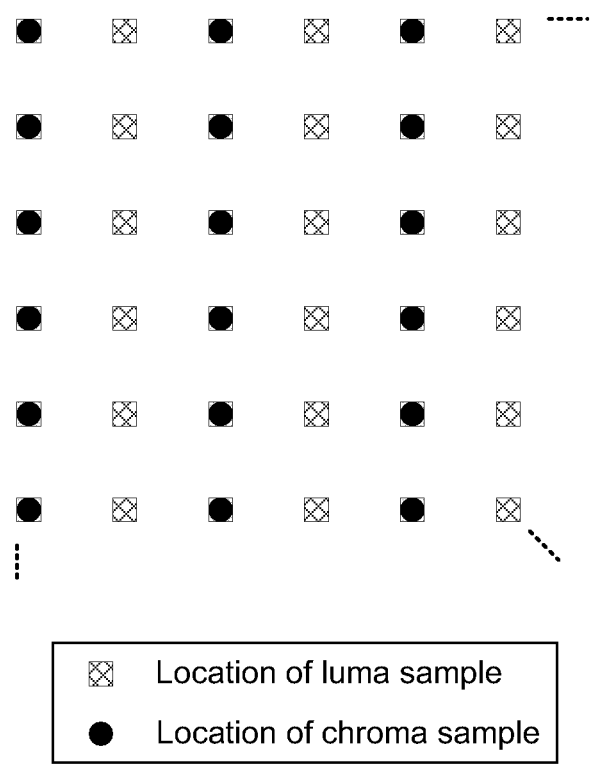
FIG. 3 illustrates an example of 4:2:2 sampling format, where a sampling pattern of the chroma samples with reference to the luma samples is shown.
Figure 4:
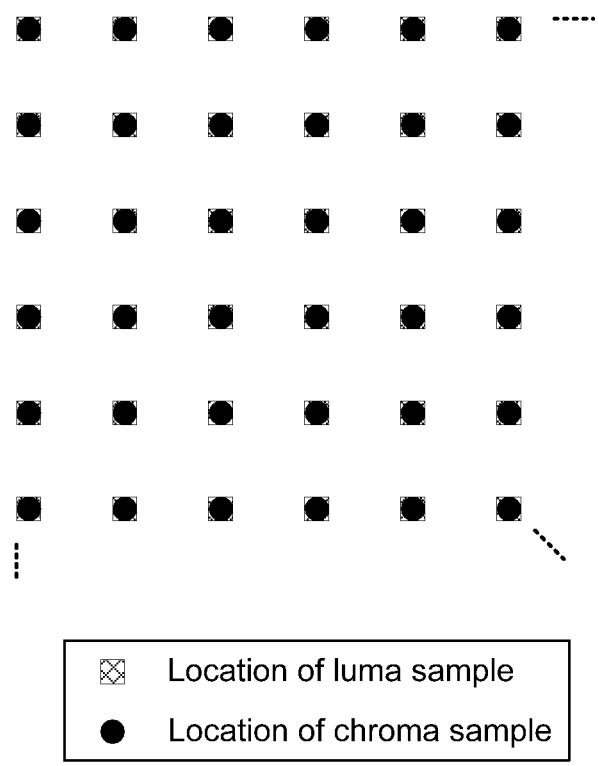
FIG. 4 illustrates an example of 4:4:4 sampling format, where a sampling pattern of the chroma samples with reference to the luma samples is shown.

In existing HEVC, several different sampling formats of chroma components are supported. For example, the sampling format may be selected from 4:2:0, 4:2:2 and 4:4:4. In some chroma sampling formats, the number of chroma samples is half of the number of luma samples in horizontal or both horizontal and vertical directions. In this case, the sample locations of the chroma pixels may be aligned with or offset from the sample locations of the luma samples. In other words, there may be phase differences between corresponding luma pixels and chroma pixels. FIG. 2 illustrates an example of phase relationship for the 4:2:0 sampling format, where the chroma samples are half of the luma samples in both horizontal and vertical directions. In the horizontal direction, the chroma samples are aligned with the luma samples. In other words, the chroma samples are always co-located with the luma samples. Therefore, the chroma samples have the same phase as the luma samples in horizontal direction. However, in the vertical direction, the chroma samples are in the middle of two neighboring luma samples. In other words, the chroma samples are offset from the luma samples by half vertical luma pixel distance. Therefore, the chroma samples are 90° offset from the luma samples in horizontal direction (phase for each pair of luma samples correspond to 360°). FIG. 3 and FIG. 4 illustrate the 4:2:2 and 4:4:4 sampling formats. As shown in FIG. 3, the 4:2:2 sampling format results in the same number of chroma samples as the luma samples in vertical direction while the number of chroma samples is half of the number of luma samples in horizontal direction. Furthermore, the chroma samples are aligned with the luma samples in both horizontal and vertical directions. As shown in FIG. 4, the 4:4:4 sampling format results in the same number of chroma samples as the luma samples in horizontal and vertical directions. Furthermore, the chroma samples are co-located with the luma samples. Luma-based chroma intra prediction mode (i.e., chroma LM mode for chroma intra prediction) utilizes the correlation between the luma pixels and the chroma pixels. Therefore, phase alignment of luma pixels and chroma pixels is important to the effectiveness of chroma LM mode.

Figure 1A:
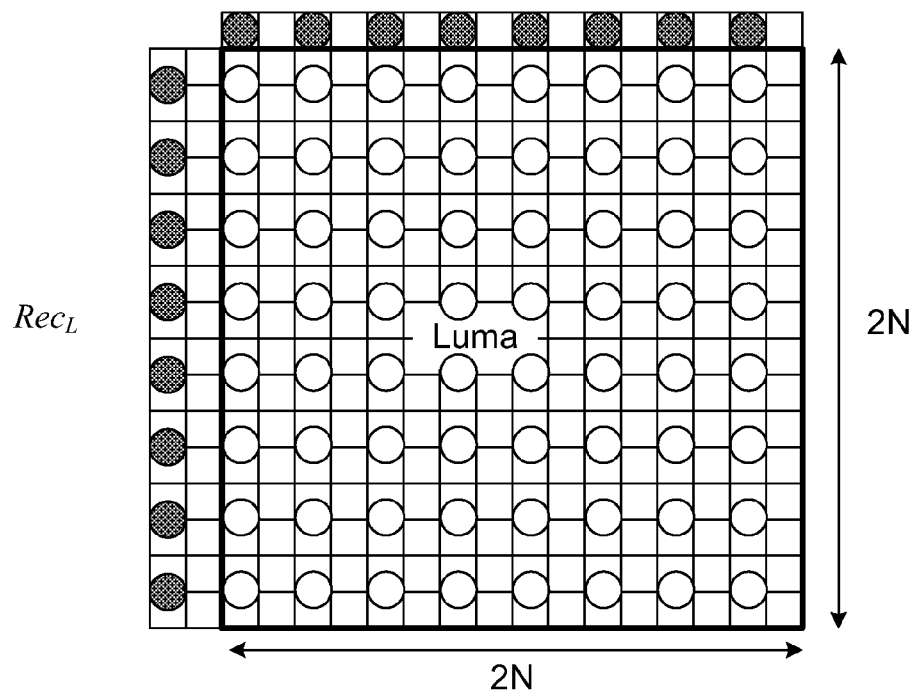
FIG. 1A illustrates an example of derivation of chroma intra prediction based on reconstructed luma pixels according to HM-5.0.
Figure 1B:
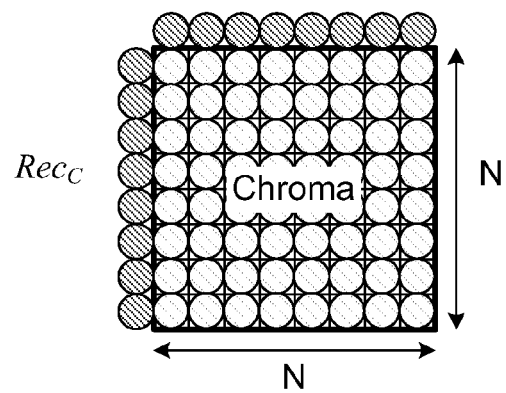
FIG. 1B illustrates an example of neighboring chroma pixels and chroma pixels associated with a corresponding chroma block to be predicted.

For the 4:2:0 sampling format being used for HEVC, the luma pixels are down-sampled using a filter corresponding to (1/4, 1/2, 1/4) in horizontal direction, where the locations of the sub-sampled luma pixels correspond to locations of the chroma pixels. On the other hand, the luma pixels are down-sampled using a filter corresponding to (1/2, 1/2) in vertical direction to match the number and locations of the chroma pixels. The sample-reduced luma pixels are then used for the prediction process of chroma LM mode. As illustrated in FIG. 1A, the first above pixel row and the second left pixel column are used for deriving the correlation parameters. However, for other sampling formats, such as 4:2:2 and 4:4:4, the method of choosing the sample-reduced luma pixels are not specified in the existing HM-5.0. Embodiments of the present invention use adaptive chroma LM mode according to the chroma sample format to better support other sampling formats.

In order to allow adaptive chroma LM mode, a syntax element indicating the chroma sampling format, named "chroma_format_idc" is added in sequence parameter set (SPS) or other parameter sets such as picture parameter set (PPS), adaptation parameter set (APS) and slice header according to an embodiment of the present invention. An example of the definition for this syntax element is shown in Table 1. Table 2 shows an example of syntax design incorporating the chroma_format_idc syntax element in SPS, where ue(v)/u(2)/u(3) represents the coding method. In this example, chroma sampling format can be coded with a variable length coding method, such as unsigned Exp-Golomb code (i.e., ue(v)) or a fixed length coding method, such as 2-bit or 3-bit coding (i.e., u(2) or u(3)).

TABLE 1

| chroma_format_idc | Chroma Format |
|---|---|
| 0 | monochrome |
| 1 | 4:2:0 |
| 2 | 4:2:2 |
| 3 | 4:4:4 |

TABLE 2

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| chroma_format_idc | ue(v)/u(2)/u(3) |
| ... | |
| } | |

With the chroma_format_idc syntax element defined, the coding system can convey the sampling format information in the bitstream by using this syntax element. The adaptive chroma LM mode can then choose the luma pixels for parameter derivation according to the chroma sampling format. For each direction, the selection method can be described as follows.

If the chroma samples are located in the same phase with the luma samples and the number is half of the number of the luma samples in horizontal or vertical direction, then sub-sampling method is used to generate sample-reduced luma pixels in the corresponding horizontal or vertical direction;

If the chroma samples are located in the same phases with luma samples in horizontal or vertical direction, and the number is equal to the number of the luma samples, no down-sampling is required in the corresponding horizontal or vertical direction; and If the chroma samples are located in the middle of two luma samples in horizontal or vertical direction, a filter corresponding to (1/2, 1/2) is used to down-sample the luma samples in the corresponding horizontal or vertical direction.

An example of deriving chroma intra prediction from reconstructed luma samples for various chroma sampling formats are shown below. The derived luma pixels $P_L'[x, y]$ at [x,y] of the current block coded in the chroma LM mode can be described as follows, where $Rec_L[x,y]$ is the reconstructed luma pixel at [x,y].

Format 4:2:0

$$P_L'[x,y]=(Rec_L[2x-1,2y+1]+2*Rec_L[2x,2y+1]+Rec_L[2x+1,2y+1]+2)>>2, \quad (1)$$

where x=0, . . . , nS−1, and y=−1, and $$P_L'[x,y]=(Rec_L[2x,2y]+Rec_L[2x,2y+1])>>1, \quad (2)$$

where x=−1, . . . , nS−1, and y=0, . . . , nS−1.

Format 4:2:2

$$P_L'[x,y]=(Rec_L[2x-1,2y+1]+2*Rec_L[2x,2y+1]+Rec_L[2x,1,2y+1]+2)>>2, \quad (3)$$

where x=0, . . . , nS−1, and y=−1, and $$P_L'[x,y]=Rec_L[2x,y], \quad (4)$$

where x=−1, . . . , nS−1, and y=0, . . . , 2*nS−1.

Format 4:4:4

$$P_L'[x,y]=Rec_L[x,y], \quad (5)$$

where x=0, . . . , nS−1, and y=−1, and $$P_L'[x,y]=Rec_L[x,y], \quad (6)$$

where x=−1, . . . , 2*nS−1, and y=2*nS−1.

The variable nS specifies the prediction size. As described in equations (1) to (4), the first above pixel row and second left pixel column of the current luma block are used when chroma sampling format is 4:2:0 and 4:2:2. Based on equations (5) and (6), the first above pixel row and the first left pixel column of the current luma block are used for the 4:4:4 sampling format. For chroma sampling format corresponds to 4:2:0 sampling format, down-sampling is applied to the first top pixel row and down-sampling is applied to the second left pixel column. For chroma sampling format correspond to 4:2:2 sampling format, sub-sampling or down-sampling is applied to the first top pixel row and no sub-sampling or down-sampling is applied to the first left pixel column. For chroma sampling format correspond to 4:4:4 sampling format, no sub-sampling or down-sampling is applied to the first top pixel row or the first left pixel column.

In another embodiment, an above pixel line and a left pixel line nearest to the current luma block are used for the parameter derivation process. Accordingly, the first above pixel row and the first left pixel column of the current block are always used regardless of the chroma sampling format. In order to match the numbers of luma samples and chroma samples, corresponding sub-sampling and down-sampling methods according to the chroma sampling format as described previously are used. This would make the parameter derivation process simpler, although the effectiveness of chroma LM mode may be affected.

Figure 5:
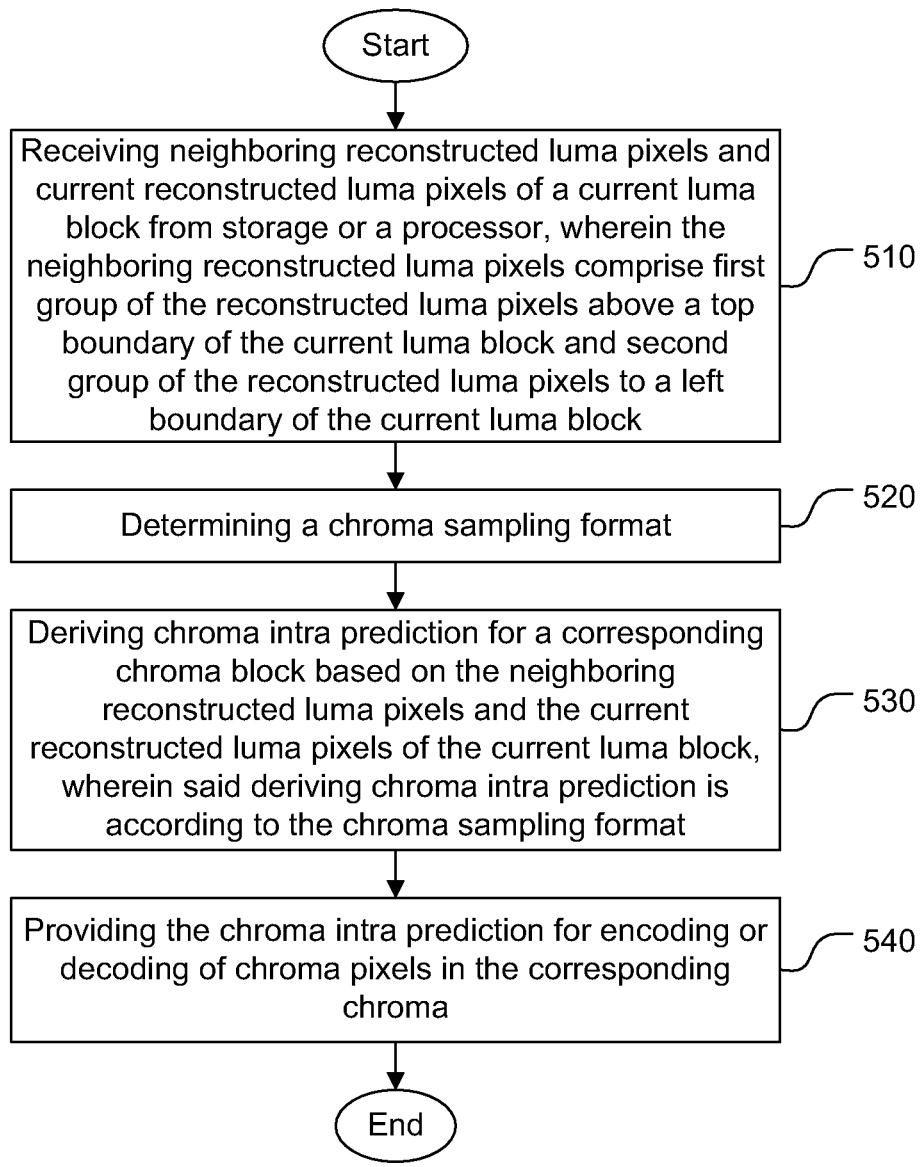
FIG. 5 illustrates an exemplary flowchart for luma-based chroma intra prediction incorporating an embodiment of the present invention.

The luma-based chroma intra prediction method described above can be used in a video encoder as well as a video decoder. FIG. 5 illustrates an exemplary flowchart of an encoder or a decoder incorporating an embodiment of the present invention. Neighboring reconstructed luma pixels and current reconstructed luma pixels of a current luma block are received from storage or a processor as shown in step 510. The neighboring reconstructed luma pixels comprise first group of the reconstructed luma pixels above a top boundary of the current luma block and second group of the reconstructed luma pixels to a left boundary of the current luma block. The reconstructed luma pixels may be retrieved from storage such as a computer memory of buffer (RAM or DRAM). The reconstructed luma pixels may also be received from a processor such as a processing unit or a digital signal processor that reconstructs the luma pixels from residual signals. In a video encoder, the residual signals are generated by the encoder. In a video decoder, the residual signals may be derived from the received bitstream. The chroma sampling format is determined in step 520. The encoder is aware of the chroma sampling format. In a decoder, the chroma sampling format may be determined from the received bitstream. The chroma intra prediction for a corresponding chroma block is then derived based on the neighboring reconstructed luma pixels and the current reconstructed luma pixels of the current luma block in step 530, wherein said deriving chroma intra prediction is according to the chroma sampling format. The chroma intra prediction is then provided for encoding or decoding of chroma pixels in the corresponding chroma as shown in step 540.

The flowcharts shown above are intended to illustrate examples of a luma-based chroma intra prediction method for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of chroma intra prediction based on reconstructed luma pixels, the method comprising:
   receiving neighboring reconstructed luma pixels and current reconstructed luma pixels of a current luma block from storage or a processor;
   determining a chroma sampling format specified using a syntax element,
   selecting, based on the chroma sampling format, a first group of reconstructed luma pixels above a top boundary of the current luma block and a second group of reconstructed luma pixels to a left boundary of the current luma block, wherein the neighboring reconstructed luma pixels comprise the first group and the second group;
   deriving chroma intra prediction for a corresponding chroma block based on the neighboring reconstructed luma pixels and the current reconstructed luma pixels of the current luma block, wherein said deriving chroma intra prediction is according to the chroma sampling format; and
   providing the chroma intra prediction for encoding or decoding of chroma pixels in the corresponding chroma.

2. The method of claim 1, wherein information associated with the chroma sampling format is incorporated in in sequence parameter set (SPS), picture parameter set (PPS), adaptation parameter set (APS) or a slice header of a video bitstream.

3. The method of claim 1, wherein said deriving chroma intra prediction comprises sub-sampling the neighboring reconstructed luma pixels and the current reconstructed luma pixels of the current luma block in one direction if the chroma sampling format corresponds to the chroma pixels being aligned with luma pixels and having half of a number of the luma pixels in said one direction.

4. The method of claim 1, wherein no sub-sampling or down-sampling is applied to the neighboring reconstructed luma pixels and the current reconstructed luma pixels of the current luma block in one direction during said deriving chroma intra prediction if the chroma sampling format corresponds to the chroma pixels being aligned with luma pixels and having a same number of the luma pixels in said one direction.

5. The method of claim 1, wherein said deriving chroma intra prediction comprises down-sampling the neighboring reconstructed luma pixels and the current reconstructed luma pixels of the current luma block in one direction if the chroma sampling format corresponds to the chroma pixels being offset from luma pixels and having half of a number of the luma pixels in said one direction.

6. The method of claim 1, wherein the first group of the reconstructed luma pixels correspond to a first top pixel row from the top boundary of the current luma block and the second group of the reconstructed luma pixels correspond to a first left pixel column from the left boundary of the current luma block for any chroma sampling format.

7. The method of claim 6, wherein sub-sampling or down-sampling is applied to the first top pixel row from the top boundary of the current luma block and the first left pixel column from the left boundary of the current luma block according to the chroma sampling format.

8. The method of claim 1, wherein the first group of the reconstructed luma pixels correspond to a first top pixel row from the top boundary of the current luma block and the second group of the reconstructed luma pixels correspond to a second left pixel column from the left boundary of the current luma block; and wherein down-sampling is applied to the first top pixel row and down-sampling is applied to the second left pixel column if the chroma sampling format corresponds to 4:2:0 sampling format.

9. The method of claim 1, wherein the first group of the reconstructed luma pixels correspond to a first top pixel row from the top boundary of the current luma block and the second group of the reconstructed luma pixels correspond to a first left pixel column from the left boundary of the current luma block; and wherein sub-sampling or down-sampling is applied to the first top pixel row and no sub-sampling or down-sampling is applied to the first left pixel column if the chroma sampling format corresponds to 4:2:2 sampling format.

10. The method of claim 1, wherein the first group of the reconstructed luma pixels correspond to a first top pixel row from the top boundary of the current luma block and the second group of the reconstructed luma pixels correspond to a first left pixel column from the left boundary of the current luma block; and wherein no sub-sampling or down-sampling is applied to the first top pixel row or the first left pixel column if the chroma sampling format corresponds to 4:4:4 sampling format.

11. An apparatus of chroma intra prediction based on reconstructed luma pixels, the apparatus comprising at least one circuit configured for:
   receiving neighboring reconstructed luma pixels and current reconstructed luma pixels of a current luma block from storage or a processor;
   determining a chroma sampling format specified using a syntax element;
   selecting, based on the chroma sampling format, a first group of reconstructed luma pixels above a top boundary of the current luma block and a second group of reconstructed luma pixels to a left boundary of the current luma block, wherein the neighboring reconstructed luma pixels comprise the first group and the second group;
   deriving chroma intra prediction for a corresponding chroma block based on the neighboring reconstructed luma pixels and the current reconstructed luma pixels of the current luma block, wherein said deriving chroma intra prediction is according to the chroma sampling format; and providing the chroma intra prediction for encoding or decoding of chroma pixels in the corresponding chroma.

12. The apparatus of claim 11, wherein information associated with the chroma sampling format is incorporated in in sequence parameter set (SPS), picture parameter set (PPS), adaptation parameter set (APS) or a slice header of a video bitstream.

13. The apparatus of claim 11, wherein said deriving chroma intra prediction comprises sub-sampling the neighboring reconstructed luma pixels and the current reconstructed luma pixels of the current luma block in one direction if the chroma sampling format corresponds to the chroma pixels being aligned with luma pixels and having half of a number of the luma pixels in said one direction.

14. The apparatus of claim 11, wherein no sub-sampling or down-sampling is applied to the neighboring reconstructed luma pixels and the current reconstructed luma pixels of the current luma block in one direction during said deriving chroma intra prediction if the chroma sampling format corresponds to the chroma pixels being aligned with luma pixels and having a same number of the luma pixels in said one direction.

15. The apparatus of claim 11, wherein said deriving chroma intra prediction comprises down-sampling the neighboring reconstructed luma pixels and the current reconstructed luma pixels of the current luma block in one direction if the chroma sampling format corresponds to the chroma pixels being offset from luma pixels and having half of a number of the luma pixels in said one direction.

16. The apparatus of claim 11, wherein the first group of the reconstructed luma pixels correspond to a first top pixel row from the top boundary of the current luma block and the second group of the reconstructed luma pixels correspond to a first left pixel column from the left boundary of the current luma block for any chroma sampling format.

17. The apparatus of claim 16, wherein sub-sampling or down-sampling is applied to the first top pixel row from the top boundary of the current luma block and the first left pixel column from the left boundary of the current luma block according to the chroma sampling format.

18. The apparatus of claim 11, wherein the first group of the reconstructed luma pixels correspond to a first top pixel row from the top boundary of the current luma block and the second group of the reconstructed luma pixels correspond to a second left pixel column from the left boundary of the current luma block; and wherein down-sampling is applied to the first top pixel row and down-sampling is applied to the second left pixel column if the chroma sampling format corresponds to 4:2:0 sampling format.

19. The apparatus of claim 11, wherein the first group of the reconstructed luma pixels correspond to a first top pixel row from the top boundary of the current luma block and the second group of the reconstructed luma pixels correspond to a first left pixel column from the left boundary of the current luma block; and wherein sub-sampling or down-sampling is applied to the first top pixel row and no sub-sampling or down-sampling is applied to the first left pixel column if the chroma sampling format corresponds to 4:2:2 sampling format.

20. The apparatus of claim 11, wherein the first group of the reconstructed luma pixels correspond to a first top pixel row from the top boundary of the current luma block and the second group of the reconstructed luma pixels correspond to a first left pixel column from the left boundary of the current luma block; and wherein no sub-sampling or down-sampling is applied to the first top pixel row or the first left pixel column if the chroma sampling format corresponds to 4:4:4 sampling format.

* * * * *